(12) United States Patent
Kawaguchi et al.

(10) Patent No.: US 6,575,632 B2
(45) Date of Patent: Jun. 10, 2003

(54) ROLLER RETAINER, ROLLER SCREW USING ROLLER RETAINER AND ROLLING GUIDE APPARATUS USING ROLLER RETAINER

(75) Inventors: Takahiro Kawaguchi, Tokyo (JP); Tadashi Hirokawa, Tokyo (JP); Kentarou Nishimura, Tokyo (JP); Osamu Maruyama, Tokyo (JP); Shino Kimura, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 09/826,008

(22) Filed: Apr. 5, 2001

(65) Prior Publication Data

US 2001/0048776 A1 Dec. 6, 2001

(30) Foreign Application Priority Data

Apr. 12, 2000 (JP) ............................... 2000-110600

(51) Int. Cl.[7] ........................... F16C 29/06; F16H 25/22
(52) U.S. Cl. ........................ 384/51; 74/424.88
(58) Field of Search ............................. 384/44, 51, 47, 384/551; 74/424.82, 424.88

(56) References Cited

U.S. PATENT DOCUMENTS

| | | | | |
|---|---|---|---|---|
| 2,785,934 A | * | 3/1957 | Alderstam et al. | 384/44 |
| 4,583,793 A | * | 4/1986 | Blatter | 384/44 |
| 4,598,957 A | * | 7/1986 | Shibayama | 384/51 |
| 4,697,935 A | * | 10/1987 | Yasui | 384/47 |
| 4,755,065 A | * | 7/1988 | Walter et al. | 384/447 |
| 4,944,607 A | * | 7/1990 | Jacob | 384/44 |
| 5,549,391 A | * | 8/1996 | Engbersen et al. | 384/51 |
| 6,070,479 A | * | 6/2000 | Shirai | 384/51 |

FOREIGN PATENT DOCUMENTS

| | | |
|---|---|---|
| GB | 1 351 258 | 4/1974 |
| JP | 60-241565 | 11/1985 |

* cited by examiner

*Primary Examiner*—Thomas R. Hannon
(74) *Attorney, Agent, or Firm*—Morgan, Lewis & Bockius LLP (57) ABSTRACT

A roller retainer 11 encloses an outer periphery of the roller 9 situated on a diagonal 20 when the roller 9 is viewed from the side surface thereof. Whether the rollers 9 are arranged in a parallel manner or in a cross manner, the roller retainer 11 is able to keep a constant position and thus the disposition of the roller retainer 11 is free from the influence of the direction the roller 9. Also, since the roller retainer 11 restricts a corner portion 9a of the roller 9, the roller 9 is difficult to slip off the roller retainer 11 and thus the roller 9 can be restricted positively, thereby being able to control the skew of the roller 9.

3 Claims, 6 Drawing Sheets

ROLLER RETAINER, ROLLER SCREW USING ROLLER RETAINER AND ROLLING GUIDE APPARATUS USING ROLLER RETAINER

BACKGROUND OF THE INVENTION

1. Field of the Invention

The present invention relates to a roller retainer which is used in a rolling guide apparatus and a roller screw and also which is used to hold rollers rolling through a circulation passage in such a manner that the rollers can be freely rotated and slid.

2. Description of the Related Art

Conventionally, there is known a roller screw structured such that a plurality of rollers are interposed between a screw shaft and a nut member. In case where the screw shaft is rotated with respect to the nut member, the nut member is moved linearly in the axial direction of the screw shaft. In the screw shaft, there is formed a spiral-shaped roller rolling groove. On the other hand, in the nut member, there is formed a roller circulation passage including a spiral-shaped load rolling groove which is so formed as to correspond to the roller rolling groove of the screw shaft. The rollers roll in such a manner that they move along the outer periphery of a screw groove between the screw shaft and nut member, thereby circulating through the roller circulation passage. In such roller screw, the plurality of rollers are, in some cases, arranged parallel in the roller circulation passage in order that the axes of the mutually adjoining rollers can be held almost parallel to each other; and, in other cases, they are cross arranged in such a manner that the axes of the mutually adjoining rollers cross each other.

Figure 13:
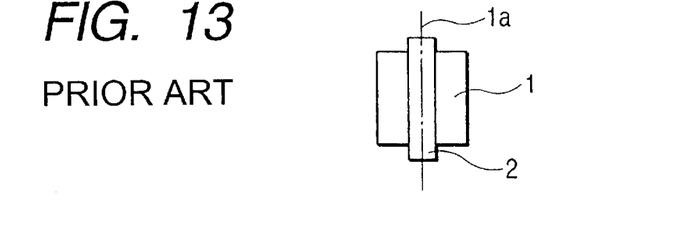
FIG. 13 is a side view of a roller retainer and a roller according to the prior art.

Generally, in a roller screw in which only the rollers are arranged in the roller circulation passage, the movements of the respective rollers can vary from one another, and the rollers can fall down in a plane including the axes of the rollers and the advancing direction of the rollers to thereby cause a so called skew. Such skew interferes with the lined-up circulation of the rollers. To prevent the skews of the rollers, there is proposed use of a roller retainer which can hold the rollers in such a manner that the rollers can be freely rotated and slid. As shown in FIG. 13, the roller retainer 2 encloses the outer periphery of a roller 1 that is situated on the center line 1a of the roller 1 when the roller 1 is viewed from the side surface thereof, and thus restricts the roller 1 to thereby prevent the roller 1 against skew.

However, in the conventional roller retainers 2, when the rollers 1 are arranged in a crossing manner, the roller retainers 2 are also arranged in a crossing manner that the roller retainers 2 cross each other, which makes it impossible to obtain a large contact area between the roller retainers 2. For this reason, the conventional roller retainers 2 cannot be applied to the rollers 1 which are cross arranged.

Also, since the conventional roller retainer 2 encloses the outer periphery of the roller 1 that is situated on the center line 1a of the roller 1 when the roller 1 is viewed from the side surface thereof, the roller 1 is easy to slip off the roller retainer 2 and the roller retainer 2 is not be able to provide a sufficient force to hold the roller 1, thereby raising a fear that the skew of the roller cannot be controlled.

SUMMARY OF THE INVENTION

The present invention aims at eliminating the above drawbacks found in the conventional roller retainer, and therefore an object of the invention is to provide a roller retainer which can be applied to both of cross arranged rollers and parallel arranged rollers and can restrict the rollers more positively in such a manner the skews of the rollers can be controlled, as well as a linear guide apparatus and a roller screw respectively using such roller retainers.

Now, description will be given below of the invention. By the way, for easy understanding of the invention, reference numerals shown in the accompanying drawings are stated herein while putting them in parentheses; however, the invention is not limited to the illustrated embodiments thereof. In attaining the above object, according to the invention, the outer periphery of a roller situated on a diagonal when the roller is viewed from the side surface thereof is enclosed by a roller retainer, and the corner portion and cylindrical portion of the roller are restricted.

In other words, according to a first aspect of the invention, there is provided a roller retainer (11) for holding a roller (9) circulating through a roller circulation passage, wherein the roller retainer (11) encloses the outer periphery of the roller (9) situated on a diagonal (20) when the roller (9) is viewed from the side surface thereof. Here, the roller retainer may hold a plurality of rollers, which respectively circulate through the roller circulation passage, in a series manner, or the roller retainer may hold the plurality of rollers individually.

According to the first aspect of the invention, since the roller retainer encloses the outer periphery of the roller that is situated on the diagonal when the roller is viewed from the side surface thereof, the roller retainer is allowed to keep a constant position whether the rollers are arranged in a parallel manner or in a cross manner and thus the disposition of the roller retainer is free from the influence of the direction of the roller. Therefore, there can be obtained a roller retainer which can be applied not only to a structure in which rollers are parallel arranged but also to a structure in which rollers are cross arranged. Also, because the roller retainer restricts the corner portion of the roller, the roller is difficult to slip off the roller retainer, thereby being able to restrict the roller positively, so that the skew of the roller can be controlled.

Also, according to a second aspect of the invention, in a roller retainer according to the first aspect of the invention, the roller retainer (11) holds individually a plurality of rollers (9) which are respectively allowed to circulate through the roller circulation passage.

In the case of a roller screw, the circulation path of a roller draws a spiral shape. In case where a roller retainer is formed in a band shape so that it can hold a plurality of rollers in a series manner, the roller retainer is spirally twisted and a load is thereby applied to the roller retainer, which raises a fear that the roller retainer can be damaged or broken. However, according to the second aspect of the invention, since the roller retainer holds the plurality of rollers individually, even in case where the circulation path of the roller is formed in a spiral shape, the roller retainer can be prevented against damage or breakage.

Further, according to a third aspect of the invention, in a roller retainer according to the first or second aspect of the invention, the roller retainer (11) is molded with the roller (9) inserted therein. As the molding method, for example, there can be employed a method in which molten resin is injection molded into a metal mold in which the roller has been installed.

According to the third aspect of the invention, a clearance between the roller retainer and roller can be made small to thereby be able to restrict the roller positively.

Also, according to a fourth aspect of the invention, there is provided a roller screw comprising: a track shaft (5) including a spiral-shaped roller rolling groove (5a) having a V-shaped section; a slide member (6) comprising a roller circulation passage including a spiral-shaped load rolling groove (6a) having a V-shaped section and assembled to the track shaft (5) in such a manner that it can be moved with respect to the track shaft (5), the load rolling groove (6a) being so formed as to correspond to the roller rolling groove (5a); a plurality of rollers (9) respectively arranged and stored in the roller circulation passage and allowed to circulate through the roller circulation passage in linking with the relative motion of the slide member (6) with respect to the track shaft (5); and a plurality of retainers (11) for holding the plurality of rollers (9) individually in such a manner that the rollers (9) can be rotated and slid, wherein each of the roller retainers (11) encloses the outer periphery of its associated one of the rollers (9) that is situated on a diagonal (20) when the roller (9) is viewed from the side surface thereof, and also wherein, in at least one of the roller rolling groove (5a) and load rolling groove (6a), there is formed a guide groove (10, 14) for guiding the roller retainer (11).

According to the fourth aspect of the invention, not only there can be obtained the above-mentioned operation effects, but also, since the roller retainer is guided by the guide groove, the fall-down of the roller retainer as well as the skew of the roller can be controlled.

Further, according to a fifth aspect of the invention, there is provided a rolling guide apparatus comprising: a track shaft (31) including a roller rolling groove (31a) having a V-shaped section; a slide member (32) comprising a roller circulation passage including a load rolling groove (32a) having a V-shaped section and assembled to the track shaft (31) in such a manner that it can be moved with respect to the track shaft (31), the load rolling groove (32a) being so formed as to correspond to the roller rolling groove (31a); a plurality of rollers (9) respectively arranged and stored in the roller circulation passage and allowed to circulate through the roller circulation passage in linking with the relative motion of the slide member (32) with respect to the track shaft (31); and, a plurality of retainers (11) for holding the plurality of rollers (9) individually in such a manner that the rollers can be rotated and slid, wherein each of the roller retainers (11) encloses the outer periphery of its associated one of the rollers (9) that is situated on a diagonal (20) when the roller (9) is viewed from the side surface thereof, and also wherein, in at least one of the roller rolling groove (31a) and load rolling groove (32a), there is formed a guide groove (38) for guiding the roller retainer (11).

According to the fifth aspect of the invention, not only there can be obtained the above-mentioned operation effects, but also, since the roller retainer is guided by the guide groove, the fall-down of the roller retainer as well as the skew of the roller can be controlled.

BRIEF DESCRIPTION OF THE DRAWINGS

FIG. 5A shows a state thereof in which they are parallel arranged and FIG. 5B shows a state thereof in which they are cross arranged;

DETAILED DESCRIPTION OF THE PREFERRED EMBODIMENTS

Hereinafter, a description will be given in more detail of preferred embodiments of the invention with reference to the accompanying drawings.

Figure 1:
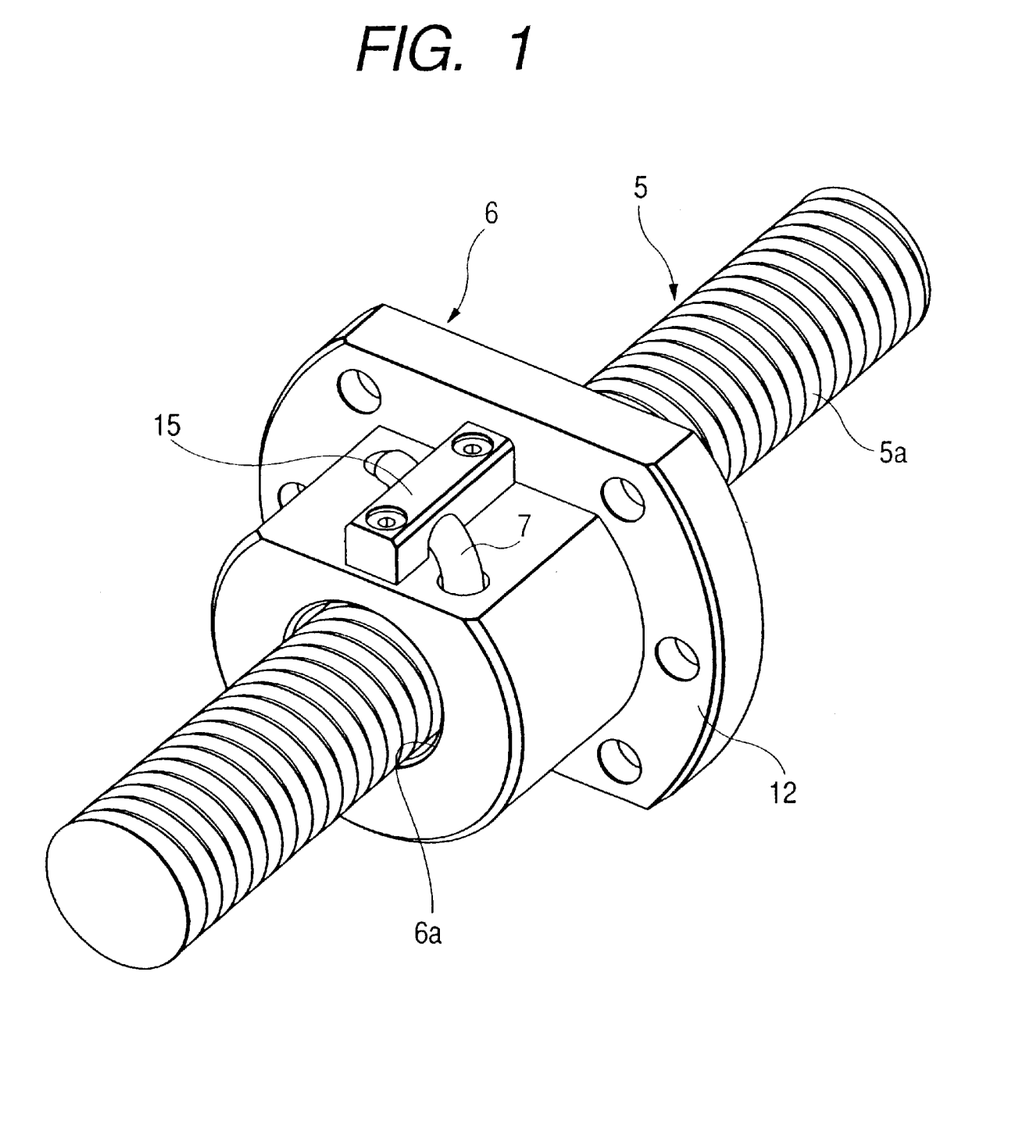
FIG. 1 is a perspective view of a roller screw incorporating therein a roller retainer according to a first embodiment of the invention.

Now, FIG. 1 shows a roller screw into which a roller retainer according to a first embodiment of the invention is incorporated. This roller screw comprises a screw shaft 5 with a spiral-shaped roller rolling groove 5a formed on the outer peripheral surface thereof, a nut member 6 (slide member), in which a roller circulation passage (rolling body circulation passage) including a spiral-shaped load rolling groove 6a formed on the inner peripheral surface thereof in such a manner to correspond to the spiral-shaped roller rolling groove 5a is formed and which is assembled to the screw shaft 5 in such a manner that it can be moved with respect to the screw shaft 5, and a plurality of rollers which are arranged and stored in the roller circulation passage and are allowed to circulate in linking with the relative movement of the nut member 6 with respect to the screw shaft 5. A load rolling passage of the roller circulation passage is formed by and between the roller rolling groove 5a of the screw shaft 5 and the load rolling groove 6a of the nut member 6. The nut member 6 includes a return pipe 7. A no-load return passage, which allows one end of the load rolling passage to communicate with the other end thereof, is formed by the return pipe 7. With the relative rotation of the screw shaft 5 with respect to the nut member 6, the roller is allowed to roll between the roller rolling groove 5a of the screw shaft 5 and the load rolling groove 6a of the nut member 6, while the nut member 6 is moved linearly with respect to the screw shaft 5.

Figure 2:
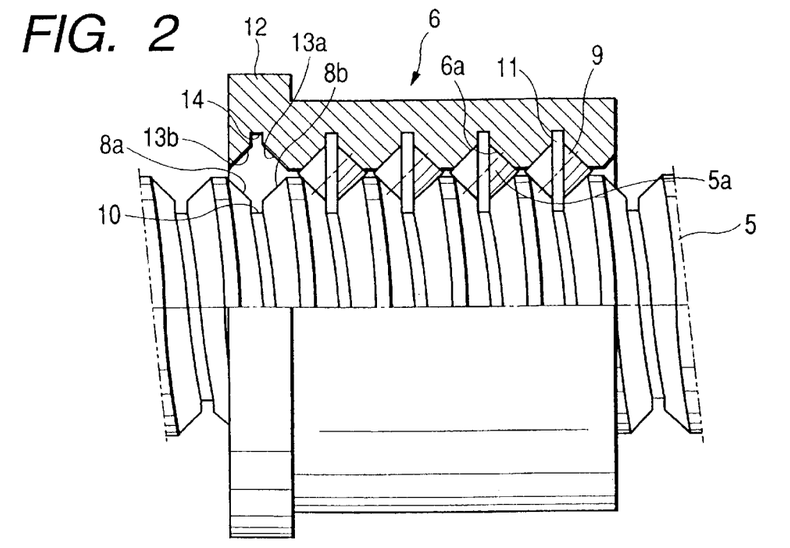
FIG. 2 is a section view of the above roller screw in the axial direction thereof.

Now, FIG. 2 shows the section of the above roller screw in the axial direction thereof. On the outer peripheral surface of the screw shaft 5, there is formed a roller rolling groove 5a having a given lead. The roller rolling groove 5a has a V-shaped section and the angle of the inclined wall surface of the V-shaped roller rolling groove 5a is set substantially at 90°. A roller 9 is allowed to roll on the wall surface 8a or 8b of the roller rolling groove 5a. In the bottom portion of the roller rolling groove 5a, there is formed a guide groove 10 which is used to guide a roller retainer 11 along the roller rolling groove 5a. This guide groove 10 is formed slightly wider than the width W of the roller retainer 11 and slightly deeper than the end face 11a of the roller retainer 11, in order to be able to avoid interference with the roller retainer 11 (see FIG. 3).

The nut member 6 is fitted with the screw shaft 5 with a clearance between them. The nut member 6 is formed substantially in a cylindrical shape and includes, in the end portion thereof, a flange 12 which is used to connect the nut member 6 to a member to be guided. On the inner peripheral surface of the nut member 6, there is formed a spiral-shaped load rolling groove 6a having a lead equal to the lead of the screw shaft 5. The load rolling groove 6a also has a V-shaped section and the angle of the inclined wall surface of the V-shaped load rolling groove 6a is set substantially at 90°. The roller 9 is allowed to roll on the wall surface 13a or 13b of the roller rolling groove 6a. Between the load rolling groove 6a and roller rolling groove 5a that adjoin each other, there is formed a substantially square-shaped load rolling passage. In the bottom portion of the load rolling groove 6a, there is formed a spiral-shaped guide groove 14 which extends along the load rolling groove 6a. This guide groove 14 is also formed slightly wider than the width W of the roller retainer 11 and slightly deeper than the end face 11a of the roller retainer 11, in order to be able to avoid interference with the roller retainer 11 (see FIG. 3). As shown in FIG. 1, in the nut member 6, there are opened up return pipe fit holes into which the two side portions of a return pipe 7 can be inserted. The return pipe fit holes are so formed as to extend into the load rolling groove 6a. The return pipe 7 is fixed to the nut member 6 by a pipe holder 15.

As shown in FIG. 2, between the load rolling groove 6a of the nut member 6 and the roller rolling groove 5a of the screw shaft 5, there are arranged and stored a plurality of rollers 9. The plurality of rollers 9, in some cases, are parallel arranged such that the axes of the mutually adjoining rollers 9 are kept almost parallel to each other and, in other cases, they are cross arranged such that the axes of the mutually adjoining rollers 9 cross each other almost at right angles. The manner of arrangement of the rollers 9 is decided according to a ratio of axial-direction loads applied to the roller screw during the reciprocating motion thereof.

Figure 3:
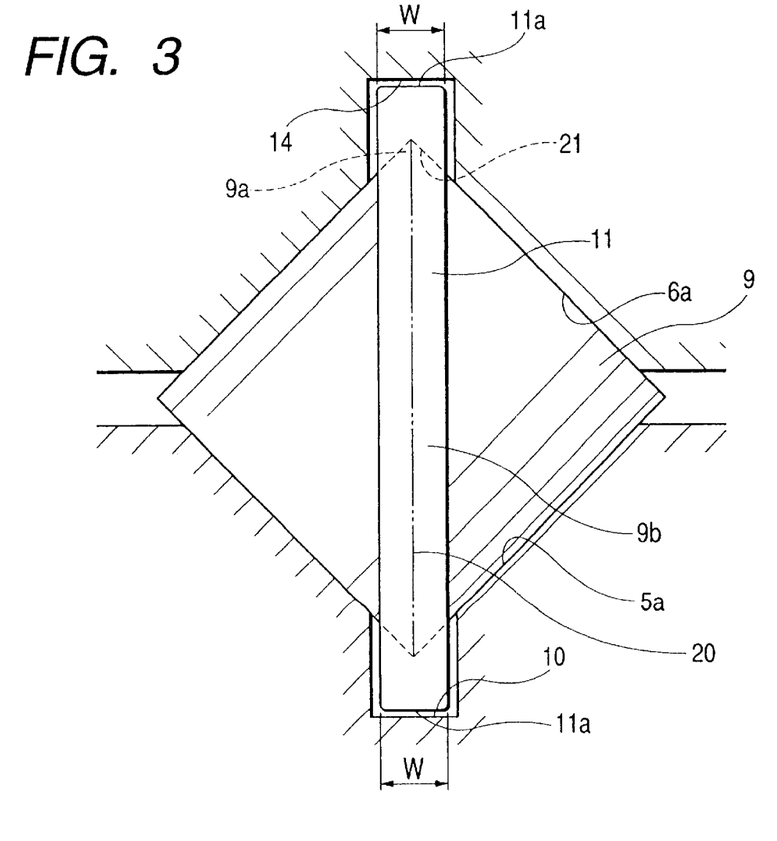
FIG. 3 is a side view of a roller retainer and a roller.
Figure 4:
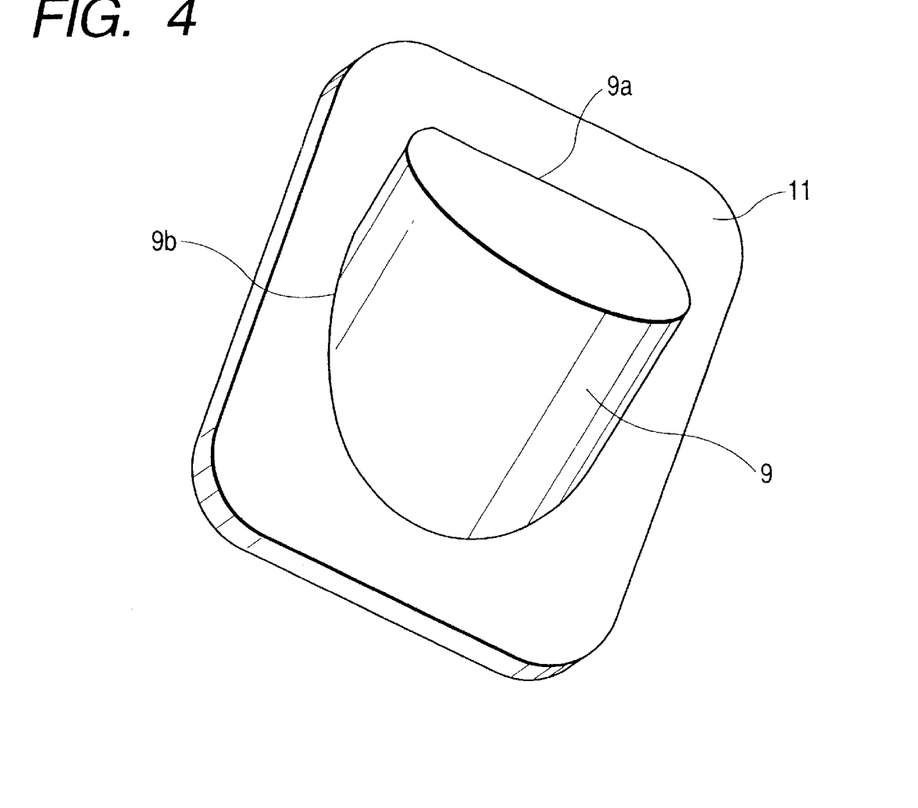
FIG. 4 is a perspective view of the roller retainer and roller.

FIGS. 3 and 4 respectively show the roller retainer 11 and roller 9 which are incorporated into the above-mentioned roller screw. Specifically, FIG. 3 is a view of the roller 9 and roller retainer 11 when they are viewed from the side surfaces thereof; and, FIG. 4 is a perspective view of the roller 9 and roller retainer 11.

The roller 9 is formed in a cylindrical shape and the side surface thereof has a substantially square shape. The roller 9 is allowed to roll between the wall surfaces 8a and 13a or between the wall surface 8b and 13b which respectively provide the mutually opposing sides of the load running passage (see FIG. 2). The outside diameter of the roller 9 is set almost the same as the distance between the wall surfaces, while the axial-direction length of the roller 9 is set slightly smaller than the distance between the wall surfaces. By the way, a pre-load may be given to the roller 9 or may not.

The roller retainers 11 are disposed in the same number as that of the rollers 9 in order that they are able to hold the plurality number of rollers 9 individually. Also, the roller retainer 11 is formed in a frame shape so that it can enclose the outer periphery of the roller 9 situated on the diagonal 20 when it is viewed from the side surface thereof. And, the corner portion 9a of the roller 9 is fitted into a fit groove 21 which is formed in the interior portion of the frame-shaped roller retainer 11 and has a V-shaped section. The roller retainer 11 restricts the corner portion 9a and cylindrical portion 9b of the roller 9. The roller retainer 11 is formed of synthetic resin and is manufactured by injection molding with the roller 9 inserted therein.

Figure 5A:
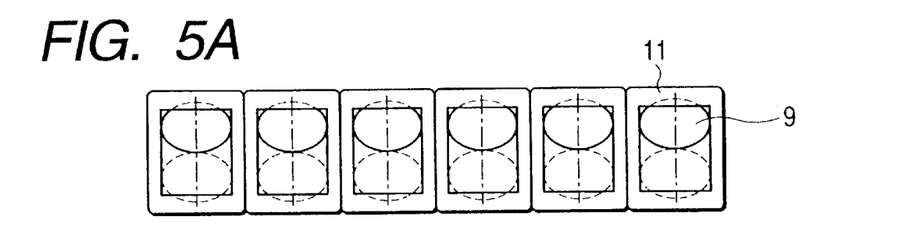
FIGS. 5A and 5B are views of roller retainers and rollers, showing a state thereof in which they are respectively arranged in line; specifically.
Figure 5B:
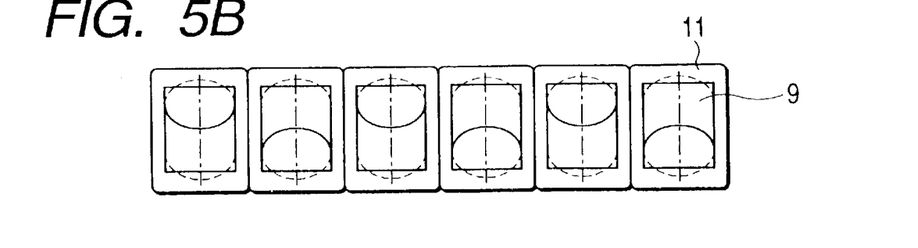

Now, FIGS. 5A and 5B show examples where the rollers 9 and roller retainers 11 are arranged linearly in a line. Specifically, FIG. 5A shows an example where the mutually adjoining rollers are arranged in such a manner that their axes are kept substantially parallel to each other, whereas FIG. 5B shows an example where the mutually adjoining rollers are arranged in such a manner that their axes cross each other substantially at right angles. In the case of the roller screw, within the return pipe 7, the rollers 9 and roller retainers 11 are arranged linearly in this manner. Also, in the case of a rolling guide apparatus which will be discussed later, within a load rolling passage and a no-load return passage, rollers 9 and roller retainers 11 are arranged linearly.

Figure 6:
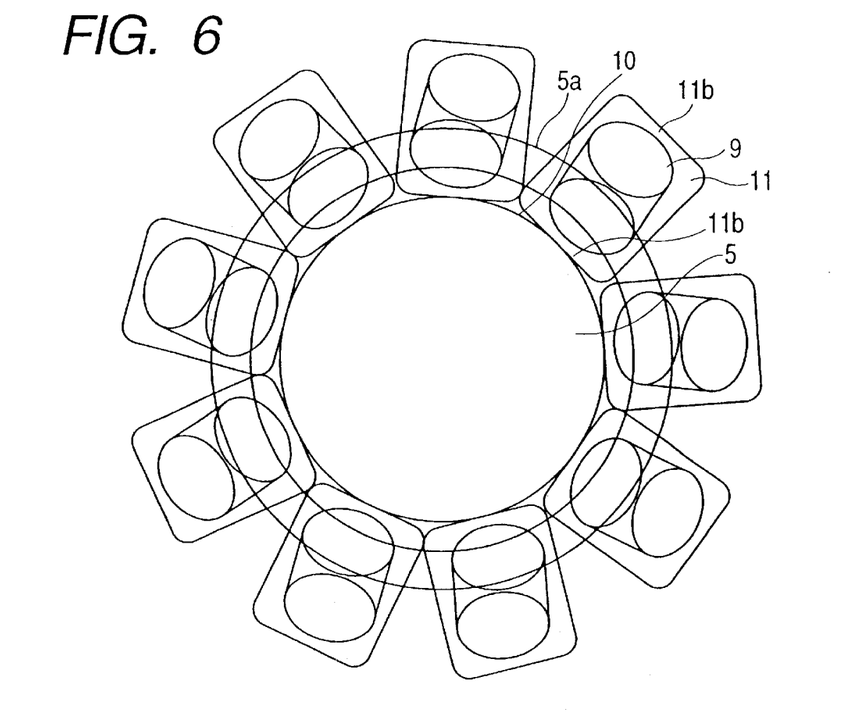
FIG. 6 is atypical view of rollers and roller retainers rolling on the periphery of a screw shaft (that is, FIG. 6 is a section view of the rollers and roller retainers in a direction crossing the screw shaft at right angles)

Now, FIG. 6 is a typical view of a roller allowed to roll along the outer periphery of the screw shaft and a roller retainer for holding this roller. In case where, the screw shaft 5 is rotated, the rollers 9 and roller retainers 11 are respectively allowed to roll in the peripheral direction of the screw shaft 5 within the load rolling passage while receiving loads. In this rolling operation, there is produced a speed difference between the inner and outer peripheral sides of the screw shaft 5 and thus the roller 9 is going to fall down in a plane including the axis of the roller 9 and advancing direction thereof, thereby causing a skew in the roller 9. However, since the roller retainer 11 restricts the corner portion 9a and cylindrical portion 9b of the roller 9, the roller 9 can be restricted positively and the skew of the roller 9 can be thereby controlled. Also, because the two end portions 11b and 11b of the roller retainer 11 are guided to the guide groove 10 formed in the bottom portion of the roller rolling groove 5a and to the guide groove 14 formed in the bottom portion of the load rolling groove 6a, the smooth circulation of the roller retainer 11 and roller 9 can be assured. Also, as shown in FIG. 6, the two end portions 11b and 11b of the roller retainer 11 are contacted with the guide grooves 10 and 14. That is, the roller retainer 11 itself is also restricted by the guide grooves 10 and 14. This can prevent the roller retainer 11 from falling down and thus the roller 9 from falling down.

The roller 9 and roller retainer 11 rolling on the outer periphery of the screw shaft 5 are picked up by the return pipe 7. The thus picked-up roller 9 and roller retainer 11 are then allowed to pass through the interior portion of the return pipe 7. And, the roller 9 and roller retainer 11 are returned again to the load rolling passage at intervals of several pitches. In case where the direction of rotation of the screw shaft 5 is reversed, the roller 9 and roller retainer 11 are allowed to circulate reversely along the above passage. By the way, in case where the screw shaft 5 is fixed and the nut member 6 can be rotated, the roller 9 and roller retainer 11 are also allowed to circulate similarly.

Figure 7:
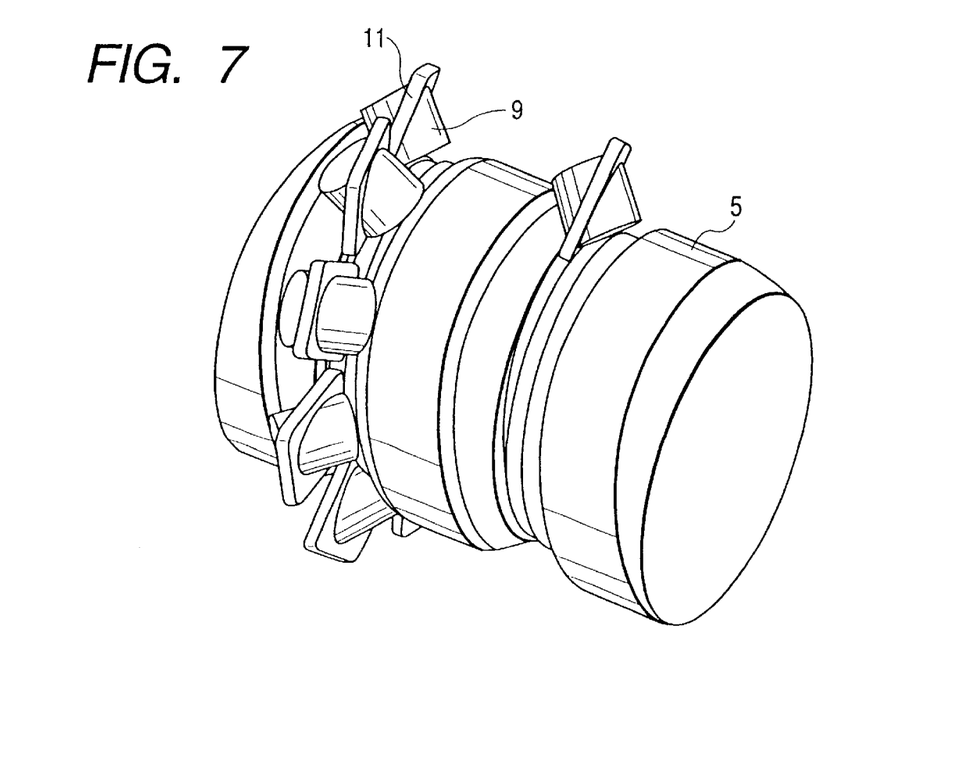
FIG. 7 is a perspective view of rollers and roller retainers which are parallel arranged in a roller screw.
Figure 8:
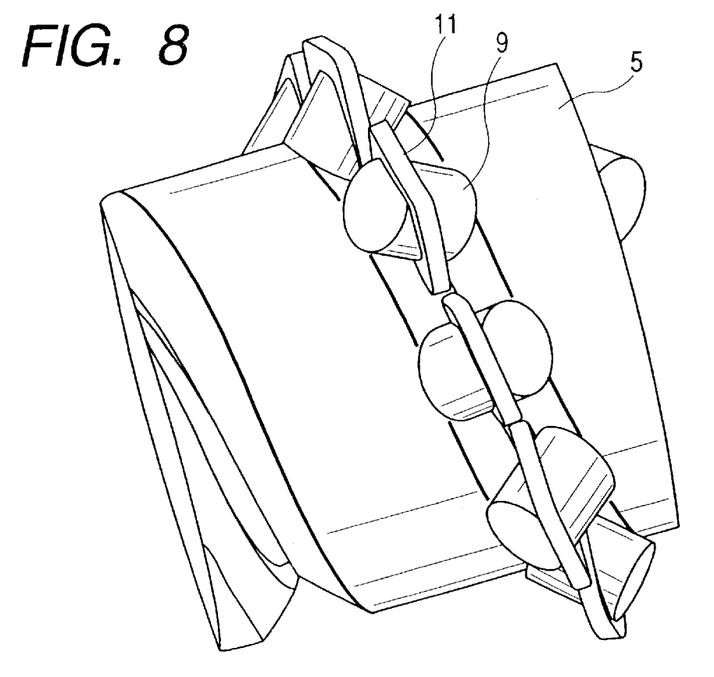
FIG. 8 is a perspective view of rollers and roller retainers which are cross arranged in a roller screw.

Now, FIG. 7 shows an example where a plurality of rollers 9 are parallel arranged in the roller circulation passage in such a manner that the axes of the mutually adjoining rollers 9 are kept substantially parallel to each other; and, FIG. 8 shows an example where a plurality of rollers 9 are cross arranged in such a manner that the axes of the mutually adjoining rollers 9 are made to cross each other substantially at right angles. As shown in these figures, whether the rollers 9 are parallel arranged or cross arranged, the roller retainers 11 are always allowed to keep a constant position, that is, the disposition of the roller retainers 11 is free from the influence of the directions of the rollers 9. Also, since the disposition of the roller retainers 11 is free from the influence of the directions of the rollers 9, the guide grooves 10 and 14 may be formed only in the bottom portions of the roller rolling groove 5a and load rolling groove 6a, so that the guide grooves 10 and 14 can be formed easily.

Figure 9:
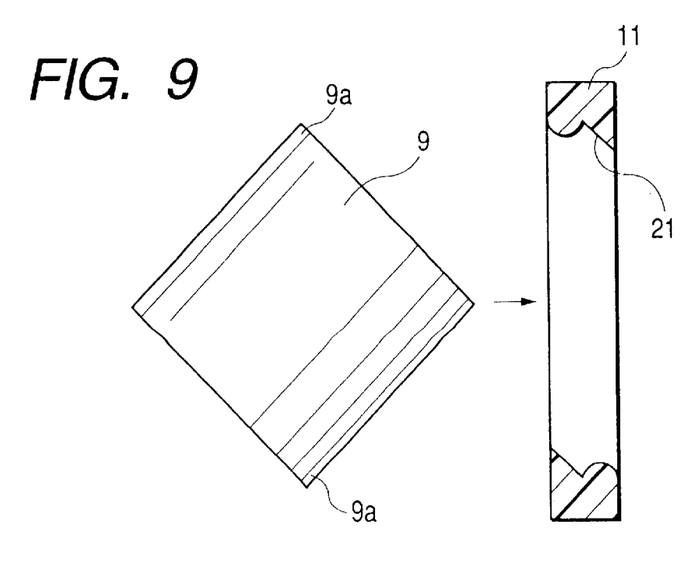
FIG. 9 is a section view of another example of a roller retainer.

Now, FIG. 9 shows another example of a roller retainer according to the invention. The present roller retainer 11 is not molded with the roller 9 inserted therein but the roller retainer 11 is formed as a single body. And, after molded as a single body, the roller 9 is fitted into the roller retainer 11. The corner portions 9a of the roller 9 are inserted into a fit groove 21 formed in the roller retainer 11. Between the roller 9 and roller retainer 11, there is provided an interference and thus the roller 9 and roller retainer 11 are interference fitted with each other. Even in case where the roller retainer 11 is formed in this manner, the clearance between the roller 9 and roller retainer 11 can be made small.

By the way, in the present roller screw, the roller 9 rolling on the roller rolling groove 5a of the screw shaft 5 is picked up by the return pipe 7 and is returned by an amount equivalent to several windings. However, alternatively, there can also be employed a structure in which a deflector for picking up the roller 9 is disposed in the nut member 6. That is, the roller 9 rolling on the roller rolling groove 5a of the screw shaft 5 may be removed from the roller rolling groove 5a by this deflector and may be then returned beyond the outside diameter portion of the screw shaft 5 to the roller rolling groove 5a that is situated by one lead ahead. Also, although not shown, there can also be employed a roller screw of a so called side cover type in which a nut member 6 is composed of a nut main body with a load rolling groove formed therein and two side covers respectively mounted on the two ends of the nut main body, in the nut main body, there is formed a roller return passage, and, in the two side covers, there are formed communication passages allowing the load rolling groove and return passage to communicate with each other.

Figure 10:
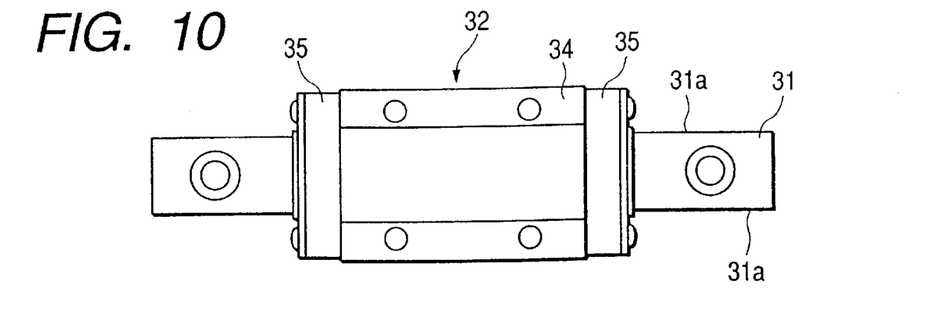
FIG. 10 is a plan view of a linear guide incorporating a roller retainer according to the first embodiment of the invention.
Figure 11:
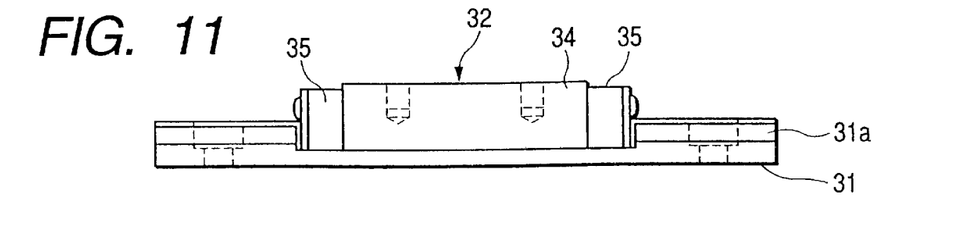
FIG. 11 is a side view of the above linear guide.
Figure 12:
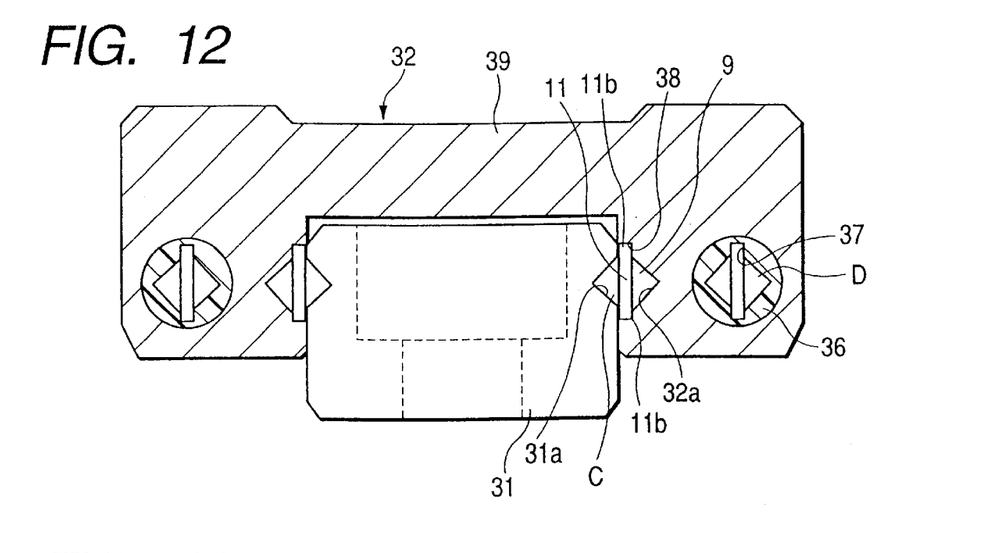
FIG. 12 is a section view of the linear guide, taken along the direction thereof to cross the axial direction thereof.

Now, FIGS. 10 and 12 respectively show a linear guide serving as a rolling guide apparatus incorporating therein the roller retainer 11 according to the first embodiment of the invention. This is a known linear guide which is used to guide a movable body such as a table set on a fixed portion such as a bed or a saddle. And, this linear guide comprises a guide rail 31 (a track shaft) which is disposed on the fixed portion and includes roller rolling grooves 31a formed along the longitudinal direction of the guide rail 31 and serving as rolling body rolling surfaces, a moving block (a slide member) 32 in which there is formed a roller circulation passage (rolling body circulation passage) including load rolling grooves serving as load rolling surfaces corresponding to the roller rolling grooves 31a of the guide rail 31 and also which is assembled to the guide rail 31 in such a manner that it can be freely moved with respect to the guide rail 31, and a plurality of rollers 9 which are respectively arranged and stored in the roller circulation passage and are allowed to circulate through the roller circulation passage in linking with the relative movement of the moving block 32 with respect to the guide rail 31. The plurality of rollers 9 are held by the roller retainers 11 individually (see FIG. 12). The rollers 9 are arranged and stored in the roller circulation passage in such a manner that the axes thereof are kept substantially parallel to each other. With the endless circulation of the plurality of rollers 9, the moving block 32 supporting the movable body is allowed to move linearly along the guide rail 31. By the way, the roller retainer 11 may also be formed in a band shape so that the plurality of rollers 9 circulating through the roller circulation passage can be held in a series manner.

The guide rail 31 is long and narrow and has a substantially square-shaped section. On the two right and left side surfaces of the guide rail 31, there are formed the roller rolling grooves 31a having a V-shaped section, which respectively extend along the whole length of the guide rail 31 in the longitudinal direction and provide a track when the rollers 9 roll. By the way, although the shown guide rail is linear, in some cases, a curved rail is also used as the guide rail. Also, while the number of the roller rolling grooves 31a is two in the illustrated embodiment, the number of the roller rolling grooves can also be changed according to the uses of the linear guide.

The moving block 32 can be substantially structured in such a manner that a moving block main body 34 and a pair of side covers 35 respectively disposed on the two ends of the main body 34 are combined together. In the moving block main body 34, there are formed two load rolling grooves 32a with a V-shaped section which are respectively opposed to the roller rolling grooves 31a (see FIG. 12). Due to the combinations of the load rolling grooves 32a and roller rolling grooves 31a, between the guide rail 31 and moving block 32, there are formed two load rolling passages C. Further, in the moving block main body 34, there are formed two return passages D which respectively extend in parallel to their associated load rolling passages C, and a pair of direction switch passages which respectively connect the respective return passages D to their associated load rolling passages C. Combination of the return passages D and load rolling passages C with the pair of direction switch passages connecting them together forms a roller circulation passage.

As shown in FIG. 12, the moving block main body 34 includes a main body block 39 and a molded body 36. The main body block 39 is a high-rigidity structure body which is made of steel in such a manner that it can stand a load to be applied to the moving block 32 and, in the upper surface of the main body block 39, there is formed a screw hole for fixing a member to be guided by the present linear guide. The molded body 36 is molded integrally with the main body block 39 according to a so called insert molding method in which molten resin is injected into a metal mold storing the main body block 39 therein. By the way, in some cases, the molded body 36 is die-cast molded using metal such as aluminum instead of the resin. Also, the invention is not limited to the above-mentioned insert molding method. For example, the main body block 39 and molded body may be formed separately and, after then, they may be combined together. Also, the main body block 39 and molded body 36 may be molded integrally according to an MIM (Metal Injection Mold) method.

The above-mentioned load rolling grooves 32a are respectively formed in the main body block 39. And, on the other hand, the return passages D are respectively formed in the molded body 36. In the main body block 39, there are formed two through holes which respectively extend in parallel to their associated load rolling grooves 32a, and the pipe-shaped portion of the molded body 36 is molded integrally with the through holes of the main body block 39. And, in the interior portion of the pipe-shaped portion of the molded body 36, there are formed the return passages D for return of the rollers as well as guide grooves 37 which are used to guide the roller retainer 11 in their associated return passages D. Also, in the main body block 39, there are formed guide grooves 38 respectively extending along their associated load rolling grooves 32a. These guide grooves 37 and 38 are respectively formed slightly wider than the width of the roller retainer 11 and slightly deeper than the end face of the roller retainer 11, in order to be able to avoid interference with the roller retainer 11. These guide grooves 37 and 38 guide the roller retainer 11 as well as, when the moving block 32 is pulled out from the guide rail 31, prevent the rollers 9 from slipping off the load rolling passages C. By the way, the guide grooves 38 may not be formed in the main body block 39 but guide grooves may be formed in the molded body that is formed integrally with the main body block 39.

As the moving block 32 is moved along the guide rail 31, the roller 9 rolls from one end of the load rolling passage C to the other end thereof while receiving a load from the moving block 32, after then, the roller 9 is picked up into one direction switch passage and is then guided to the return passage D and, further, the roller 9 is returned to one end of the load rolling passage C through the other direction switch passage. During circulation of the roller 9, the roller 9 is going to fall down in a plane including the axis of the roller 9 and the advancing direction thereof, thereby causing a skew in the roller 9. However, since the roller retainer 11 restricts the corner portion 9a of the roller 9, the roller 9 can be restricted positively to thereby be able to control the skew of the roller 9. Also, because the end portions 11b and 11b of the roller retainer 11 are guided by the guide grooves 38 respectively formed in their associated load rolling grooves 32a, the smooth circulation of the roller retainer 11 and roller 9 can be assured. Further, since the roller retainer 11 according to the present embodiment encloses the outer periphery of the roller 9 that is situated on the diagonal thereof when the roller 9 is viewed from the side surface thereof, whether the rollers 9 are parallel arranged or cross arranged, the roller retainer 11 is able to always keep a constant position and thus the disposition of the roller retainer 11 is free from the influence of the direction of the roller 9. Therefore, the guide grooves 37 and 38 may be formed only at the diagonal positions of the roller 9, which can facilitate the formation of the guide grooves 37 and 38.

By the way, in the present embodiment, the relative motion of the moving block 32 and guide rail 31 is linear; however, the invention can also apply suitably to a guide apparatus in which the relative motion is curved.

Also, the roller retainer according to the invention can also apply to a roller spline which is used as a rolling guide apparatus and further can apply to a bearing such as a swing bearing, provided it uses rollers.

As has been described heretofore, according to the invention, since each roller retainer encloses the outer periphery of its associated roller that is situated on the diagonal when the roller is viewed from the side surface thereof, the roller retainer is allowed to keep a constant position whether the rollers are arranged in a parallel manner or in a cross manner and thus the disposition of the roller retainer is free from the influence of the direction of the roller. Therefore, there can be obtained a roller retainer which can be applied not only to a structure in which rollers are parallel arranged but also to a structure in which rollers are cross arranged. Also, because the roller retainer restricts the corner portion of the roller, the roller is difficult to slip off the roller retainer, thereby being able to restrict the roller positively, so that the skew of the roller can be controlled.

What is claimed is:

1. A roller screw comprising:

a track shaft including a spiral-shaped roller rolling groove having a V-shaped section;

a slide member including a roller circulation passage including a spiral-shaped load rolling groove having a V-shaped section and assembled to said track shaft so as to move with respect to said track shaft, said load rolling groove corresponding to said roller rolling groove;

a plurality of rollers arranged and stored in said roller circulation passage and allowed to circulate through said roller circulation passage in linking with the relative motion of said slide member with respect to said track shaft; and a plurality of retainers for holding said plurality of rollers individually so that said rollers are rotated and slid;

wherein each of said roller retainers encloses the outer periphery of its associated one of said rollers that is situated on a diagonal when said roller is viewed from the side surface thereof, and also wherein, in at least one of said roller rolling groove and said load rolling groove, there is formed a guide groove for guiding said roller retainer.

2. The roller screw as set forth in claim 1, wherein said guide groove is formed in a bottom portion of at least said one of said roller rolling groove and said load rolling groove.

3. The roller screw as set forth in claim 1, wherein said roller retainer has a groove internal to said roller retainer, said groove includes a first portion which is adapted to engage a corner portion of said roller and a second portion which is adapted to engage a cylindrical portion of said roller, a sectional shape of the first portion is different from that of the second portion.

* * * * *